United States Patent [19]

Idler

[11] 4,170,283
[45] Oct. 9, 1979

[54] ARTICLE ORIENTING DEVICE

[75] Inventor: Gustav Idler, Weinstadt, Fed. Rep. of Germany

[73] Assignee: Firma C. Eugen Maier Metallverarbeitung GmbH, Fed. Rep. of Germany

[21] Appl. No.: 840,963

[22] Filed: Oct. 11, 1977

[30] Foreign Application Priority Data

Oct. 8, 1976 [DE] Fed. Rep. of Germany ....... 2645399

[51] Int. Cl.² ............................................ B65G 47/24
[52] U.S. Cl. ....................................... 193/45; 193/47
[58] Field of Search ................... 193/40, 44, 45, 47, 193/48; 221/290, 171, 172, 173; 198/400, 416

[56] References Cited

U.S. PATENT DOCUMENTS

| 3,456,770 | 7/1969 | Walk | 193/47 |
| 3,587,804 | 6/1971 | Marenco | 193/47 |

*Primary Examiner*—Robert B. Reeves
*Assistant Examiner*—James L. Rowland
*Attorney, Agent, or Firm*—McGlew and Tuttle

[57] ABSTRACT

A device for the non-reversed setting up of rod shaped bodies having ends of different thicknesses and particularly for orienting conical tubes for yarn spinning and twisting machines comprises a feed chute along which the bodies are fed with their sides adjacent and with their ends generally aligned. The feed chute includes an opening in which there are disposed two spaced apart supports oriented adjacent the respective ends of the tubes which are fed one after the other into the opening. Two pressing fingers are mounted so that they move through a path overlying the respective ends of the tubes simultaneously in a manner such that one of them only will contact the thicker end of the tube to begin moving it downwardly over the associated support. This downward movement permits downward movement of the thicker end of the tube which is accelerated by displacement of the respective support out of the path of the thicker end while the other end is held and then centered over setting stops until the thicker end is lowermost. The tube is aligned in a vertical position with the aid of a turning duct and it is oriented in a lateral opening of a passage on an inclined plane so that it feeds downwardly with the lowermost end always oriented at the base of the plane.

29 Claims, 6 Drawing Figures

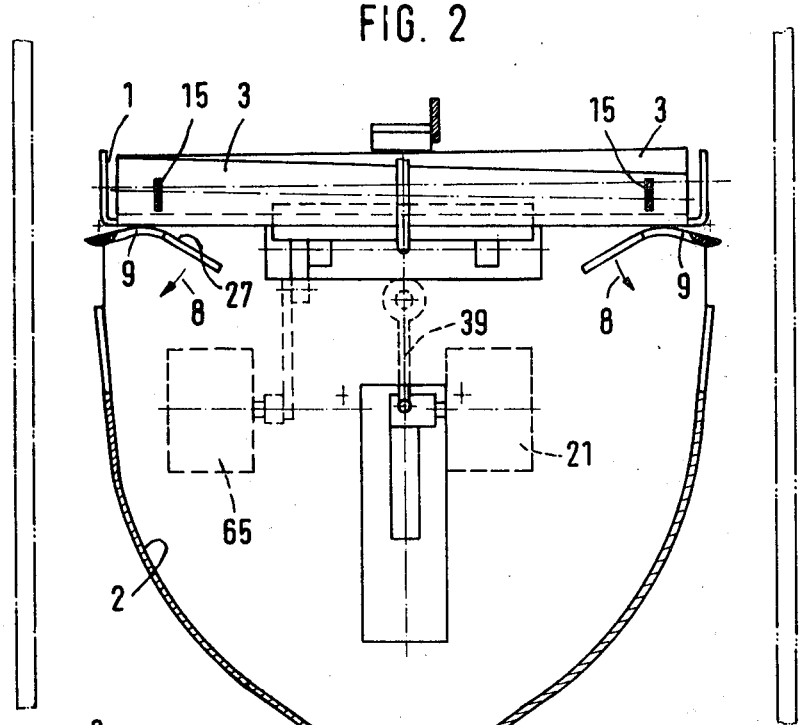
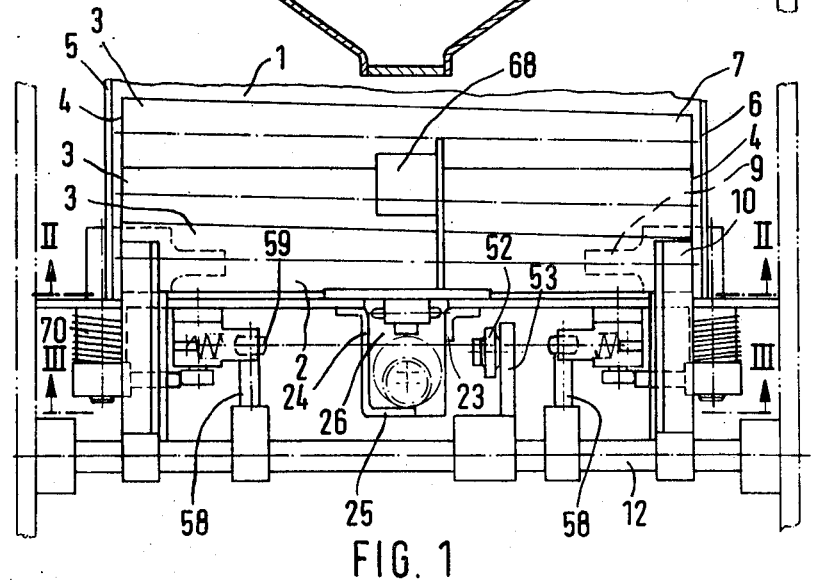

ARTICLE ORIENTING DEVICE

BACKGROUND OF THE INVENTION

FIELD OF THE INVENTION

The invention relates to a device for non-reversed setting up of rod-shaped bodies having ends of different thickness, more particularly of conical tubes for spinning, twisting and similar machines, comprising a feed chute, and a feed duct or the like. Devices of this kind are known per se, and they are often used in connection with a so-called doffer for automatic bobbin change in spinning, twisting and similar machines. It is regarded as advantageous, however, that all bodies or tubes must be introduced into the feed duct or the like in the same position. There are, of course, devices which can place tubes received in a box in parallel, but side-reversed, arrangement into another box in correct arrangement. The latter box is then placed on the doffer, which takes out the tubes singly and transfers them to a spinning machine or the like. During transportation of the box with some of the tubes being greatly slanted, it occasionally happens that one or the other tube falls out and is subsequently reinserted side-reversed. In this position it cannot be forwarded by the doffer and the latter consequently interrupts the bobbin change. The non-reversed storing of tubes in this box makes necessary slanting end faces and hence comparatively high costs.

SUMMARY OF THE INVENTION

The object of the invention is therefore seen in providing a device for non-reversed setting up, of the above-identified kind, in whose feed chute or the like the bodies, in particular the conical tubes, need no longer be introduced non-reversed and which nevertheless sets them up non-reversed.

For the solution of this problem a device according to the preamble of claim 1, is proposed, and it is designed according to the invention as defined in the characterizing part of the first claim. To simplify matters, only "tubes" are mentioned in the following, but always conical tubes are meant, although this is not to be understood as a limitation. The rod-shaped body actually need not have the form of a cone nor must it be hollow.

The tubes are introduced in a suitable manner into the feed chute, their thicker end being selectively associated with the left or the right duct side. This makes possible for example the use of a tube box with an outlet opening at the bottom, from which the tubes automatically fall out and into the feed chute or the like, whose width preferably corresponds approximately to the tube length. Either by the thrust of the following tubes, or by a suitable device, the tubes contained in the feed chute are moved toward the supporting members. For this reason, advantageously a feed chute is used having a slight inclination toward the supporting members. The supporting members are dimensioned so that only one tube finds space thereon. The equivalent is true also of the pressing fingers. The distance of the pressing fingers from the supporting members must be selected so that also the thicker end of the fed tube can easily pass therebetween. On the other hand, the supporting members should be flush with the associated end of the feed chute or the like or should extend at a little lower level. As soon as a tube rests on the supporting members, the two pressing fingers are positioned by an automatic or manual release. As they are equidistant from the supporting members and are approached simultaneously as well as equally fast, always that pressing finger impinges on the tube with which the thicker tube end is associated. Consequently, this pressing finger presses against the thick tube end and this pressure is transmitted to the supporting member present below the thick tube end. The supporting member gives way and thereby releases the thicker tube end. This leads to a downward tilting of the tube with the thicker end first. Consequently, it is immaterial whether the thicker end is associated with the left or the right side of the feed chute or the like. The positioning movement of the pressing fingers ends before the thinner tube end is contacted by its associated pressing finger. As soon as the tube is set up correctly—i.e., in this case with the thicker end down—the pressing fingers are moved up again and the deflected supporting member is returned to its starting position. Now the next tube can be placed on the supporting members and set up.

A preferred embodiment of the invention is characterized by a turning duct which is symmetrical to a vertical plane, tapers arcuately in the downward direction, is located below the supporting members, and approximately corresponds to the thicker body end. This duct prevents the falling tube from executing uncontrolled movements. the tube can move only within the turning duct, and normally executes a 90° rotation. Naturally, the turning duct must be openable or be provided with an opening through which the erected tube can be removed, in particular crosswise to the direction of fall.

A development of the invention is characterized by a pendulum type setting stop which is arranged centrally in the turning duct below the supporting members and is pivotable about an axis extending approximately perpendicularly to the turning duct plane, and the free, particularly, angled, end of which extends within the turning duct crosswise. When the tube, set in motion by the pressing finger, tumbles into the turning duct with its thicker end first, its central portion impinges on the setting stop, i.e., the angled end portion thereof projecting into the duct. The pendulum type arrangement and the unequal weight of the two tube halves cause pivoting of the angled end portion toward the thinner tube end. Thereby, the point of support of the falling tube is displaced still farther from the center of gravity, whereby the setting-up movement is accelerated. After completion of the setting-up process and removal of the erected tube from the device, the setting stop automatically swings back to its central position.

As has been explained, if fed horizontally, the tube is rotated through 90°. Especially due to the abrupt impingement of the setting stop, the tube receives a strong angular momentum which might cause its rotation through more than 90°. This would result in an undesired tilting over of the tube. To avoid such a risk, a further development of the invention provides an end stop which is arranged in the turning duct centrally above the setting stop and is likewise pivotable about an axis extending approximately perpendicularly to the turning duct plane. Against this end stop, the thinner end of the tube abuts as soon as the tube to be erected reaches its close to vertical position. The rotational movement of this thinner tube end causes the setting stop to give way laterally. This lateral movement may be limited, preferably, by a stop which is provided in the turning duct at a location ensuring that the upper tube end will be stopped approximately in its central position within the turning duct. The mass of the two stops is extremely small, so that the stops cannot exert any undesirable forces, e.g. restoring forces, onthe uprighted tube. The setting stop is to be arranged and/or designed so as not to interfere with the start of the falling movement or with the forward rolling onto the supporting members of the tubes to be set up and to perform its function only under the impingement of the thinner tube end. A preferred variant of the invention to this effect provides that the end stop is designed in pendulum fashion, and that its free end, located below the axis of rotation, and, more particularly, having the shape of a bent-off leg, extends within the turning duct obliquely. Insofar, there is a certain similarity with the design of the setting stop. If the end portion of the end stop, formed by the free bent-off leg, is provided at a level too low relative to the supporting members, the end stop might prevent the tube from falling into the turning duct, or at least would interfere therewith. In such a case, it is of particular advantage if the end stop is pivotable about a second axis normal to its axis of rotation and if a passage opening for the end stop is provided in the rear wall of the turning duct. The leg close to this cardanic suspension of the end stop must be angled or at least extend obliquely to the plane of the turning duct. As soon as the falling tube impinges on the portion of the end stop projecting into the turning duct, this portion is pushed through the rear opneing out of the turning duct. But as soon as the tube has passed the end stop, the end stop returns into its initial position, preferably under its own weight, already before the thinner tube end has reached the center of the duct. The end stop will thus have occupied its blocking position still in time.

According to a preferred embodiment of the invention, it is provided that the two supporting members are held in their initial positions each by a detent member and the detent members are resiliently pressed into corresponding notches provided in the supporting member. Therefore, the respective supporting member having to give way can be brought into its release position only after the detent member has been pushed out of its notch, and against the resistance of a load spring.

An expedient development of the invention provides that each detent member is mounted or formed on a lever arm of a double-armed stop lever, and that the other two lever arms of the stop levers are connected to each other by means of a tension spring. Different hinge points may be provided on the lever arms for this spring. In this way, the torque produced by the spring can easily be varied.

A particularly advantageous variant of the invention consists in that during release each detent member can be moved past a cam of its supporting member, the cam height decreasing in the release direction. With the aid of the cam and of the spring force an accelerated release movement of the detent member associated with the thicker tube end is achieved. What is of particular advantage here is that each supporting member is rotatable about an axis extending crosswise to the plane of the turning duct and perpendicularly to the longitudinal axis of the body resting thereon, and that the supportng members point toward each other by their free, plate-shaped ends. In this variant the cam is perpendicular to the bearing surface of the supporting member i.e. it extends in a vertical plane or in a plane slightly inclined to the vertical. The plate-shaped bearing surface of the supporting members is advantageously convexly arched. Thereby a lateral spacing of the bearing point from the axis of rotation of the supporting member and hence the necessary torque is obtained. It is now possible to provide the axis of rotation of the supporting member close to the tube end. The free leg portion of the supporting member extending beyond the bearing point supports the righting movement of the falling tube. In addition, this shape facilitates the gliding and guiding of the thicker end on its bearing surface.

In a further development of the invention, the body to be erected and resting on the supporting members, is held spaced from the rear wall of the turning duct by means of at least one, but preferably two, retractable spacing members which are provided at laterally spaced locations. These spacing members prevent the body from applying against the rear wall of the turning duct prior to the release and thereby possibly opposing an unnecessarily great resistance to the set up motion. The spacing members are retracted shortly before the pressing finger impinges on the thicker tube end. In this connection, it is of great advantage if the motion of the spacing members and the pressing fingers is coupled, with the pressing movement of the fingers following the at least partial retraction of the spacing members. The pressing movement of the fingers must not be mixed up with their positioning movement, i.e., the pressing fingers can be positioned piror to withdrawing the spacing members. On the other hand, it must be made sure that upon impingement of one of the pressing fingers upon the thicker tube end, the tube at least no longer rests against the tube (sic). Therefore, it is not absolutely necessary that at the release of the supporting member associated with the thicker tube end, the spacing members are already completely retracted behind the rear wall of the turning duct.

In a preferred embodiment of the invention, the pressing fingers are rotatably mounted on or by means of a shaft, and each spacing member is hinged eccentrically to this shaft, to an element connected to the shaft, more particularly to the pressing finger. Consequently the spacing members are retracted the more the deeper the pressing fingers are engaged.

According to a further development of the invention, it is provided that the pressing fingers are pivotable by means of a lifter rod, which in turn is drivable by a rotating cam plate. The cam plate is driven continuously or intermittently by a motor, more particularly an electric motor. The cam plate may have other functions as well, for instance the actuation of switches. On the other hand, it is also conceivable to actuate switches and the like additionally or solely by another cam plate or eccentric sheave carried by the shaft of the first cam plate.

According to another development of the invention, it is provided that the cam plate lifts the pressing fingers immediately after the supporting member associated with the thicker body end has been swung down. This is expedient in particular with bodies and tubes whose ends differ but slightly in thickness. With such a tube, if the release is provided at the thicker end, the other pressing finger is spaced only very slightly from the top side of the thinner tube end. As the thicker tube end falls, the thinner end sets itself slantwise in the gap between its pressing finger and its supporting member. This slanting position might cause the tube to get stuck at this thinner end. It would then be necessary to stop the device and to take the tube out by hand. This is avoided by the above described design, according to which both pressing fingers are lifted a little immediately after the release at the thicker tube end, thereby increasing the gap for the thinner tube end. The amount of necessary lift of the pressing fingers may easily be determined from the geometric proportions of the device and of the bodies. If the motion of the pressing fingers is coupled to the motion of the spacing members, this lifting of the pressing fingers is somewhat limited. Their lift must end when the spacing members enter the turning duct or protrude therein far enough to hinder the fall of the tube.

A preferred variant of the invention provides that the lifter rod returns the released pressing finger to its locked position by means of a pivot arm. Then, of course, also the spring for the detent or detents must be tensioned again.

In a preferred manner, each supporting member can be moved into its release position against the force of a return spring, this return spring being weaker than the tension spring for the release. The mechanism must be designed in a manner such that the detent member, returned to its initial position by means of the lifter rod, is moved a little beyond its release position, so as not to hinder the return of the released supporting member brought about by a comparatively weak spring. As soon as the returned supporting member has assumed its end position, the returned detent member can be released for engaging its notch.

Another preferred embodiment of the invention is characterized in that at the inner end of the feed chute, upstream of the turning duct, a controllable holding element is provided for the next body which is in bystand position during a release operation. If there are very many bodies or tubes in the feed chute or the like, they will, as has been explained above, exert a relatively strong pressure on the frontmost tube. Thereby, the frontmost tube may be pressed against the rear wall of the duct or against the spacing members, and fail to fall into the turning duct, even with the mechanism released. Undesirable would be even a delayed falling. For this reason, the next tube is retained by means of the controllable holding element until it can no longer interfere with the operative cycle for setting up the innermost tube. Especially when the tubes are fed by gravity, this can also prevent the next to innermost tube from sliding down before the released supporting member has returned to its starting position and is locked. It should further be noted in this connection that the supporting member need not necessarily be locked by a detent but may be held in the lifted position by means of a magnet, for example. Then, however, it cannot be brought back into the range of action of the magnet by means of a spring, and a linkage must be used for this purpose. The holding element is advantageously controllable by means of a magnet, more particularly a rotary magnet, with a suitable linkage or the like being connected therebetween of course.

Another advantageous variant of the invention provides a downwardly sloping slide plane for the uprighted body, which plane extends crosswise to the plane of the turning duct at the lower end thereof. On this sloping plane, the tube in vertical position slides out of the turning duct. This sliding movement can be suitably supported in order to accelerate the operating cycle. As soon as the tube has left the turning duct, the next tube can be set up. It is particularly advantageous to provide two guide elements for the sliding body or tube laterally above the sliding plane. They prevent the tube from tipping sideways. On the other hand, the erected tube is removed by means of a suitable device, e.g. a controllable arm, more specifically a pivot arm, as has been explained above. Such an arm may grip the tube as soon as the tube is erected, i.e., brought into a vertical of substantially vertical position as shown. This necessarily prevents the tube from tipping over, without further measures.

Advantageously the feed chute or the like slopes down toward the turning duct, and the turning duct is disposed approximately at right angles to the plane of the feed chute. This causes a slightly inclined position of the set-up body, whereby the body is enabled to leave the turning duct along the sliding plane by gravity alone. As mentioned above, this movement may even be accelerated, for example, quite expediently by an ejector movable against the set-up body from the rear wall of the turning duct. Naturally, the movement of the ejector must be coordinated with those of the other controllable device elements or controlled by the tube itself. In a preferred embodiment of the invention, the ejector comprises at least one pivoting lever and may be positioned by means of a magnet, preferably a rotatable magnet. Provided the supporting member and the pressing finger are already set back and may be locked, the holding element for the next to innermost tube can be retracted or pivoted back as soon as the ejector is actuated.

One embodiment of the invention is illustrated in the drawing, in which:

FIG. 1 is a top view, partially broken away, of the inventive device;

FIG. 2 is a vertical sectional view taken along the line II—II of FIG. 1;

GENERAL DESCRIPTION OF THE PREFERRED EMBODIMENTS

The device in the shown embodiment is intended primarily for setting up conical tubes for spinning, twisting and similar machines, for which reason there will be mention in the following simply of "tubes" or "conical tubes", without implying any limitation. The device is able to set up in non-reversed position any other rod-shaped bodies, having two ends which differ in thickness.

Figure 3:
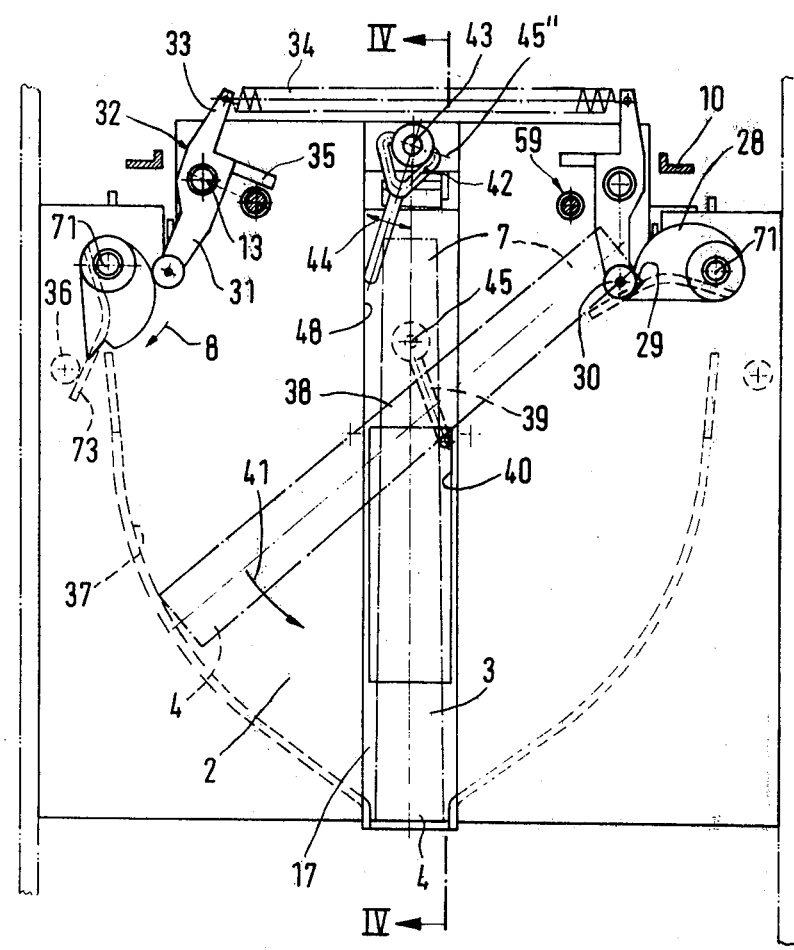
FIG. 3 is a sectional view taken along the line III—III of FIG. 1.

The feed chute 1 is inclined downwardly toward the turning duct 2, so that the tubes 3 move toward the turning duct 2 under their own weight alone. This is true in particular when the tubes are fed from a bin which is supported on the feed chute and has a bottom aperture associated with the feed chute, so that the tubes exert a strong thrust. Especially when using such a bin, the thicker end 4 of a tube may be associated either with the left wall 5 or the right wall 6 of the chute (FIG. 1). Nevertheless, the inventive device is able to set up all the tubes in identically oriented positions, namely, in the specific case, so with their thicker ends 4 down and their thinner ends 7 up (FIG. 3).

Figure 4:
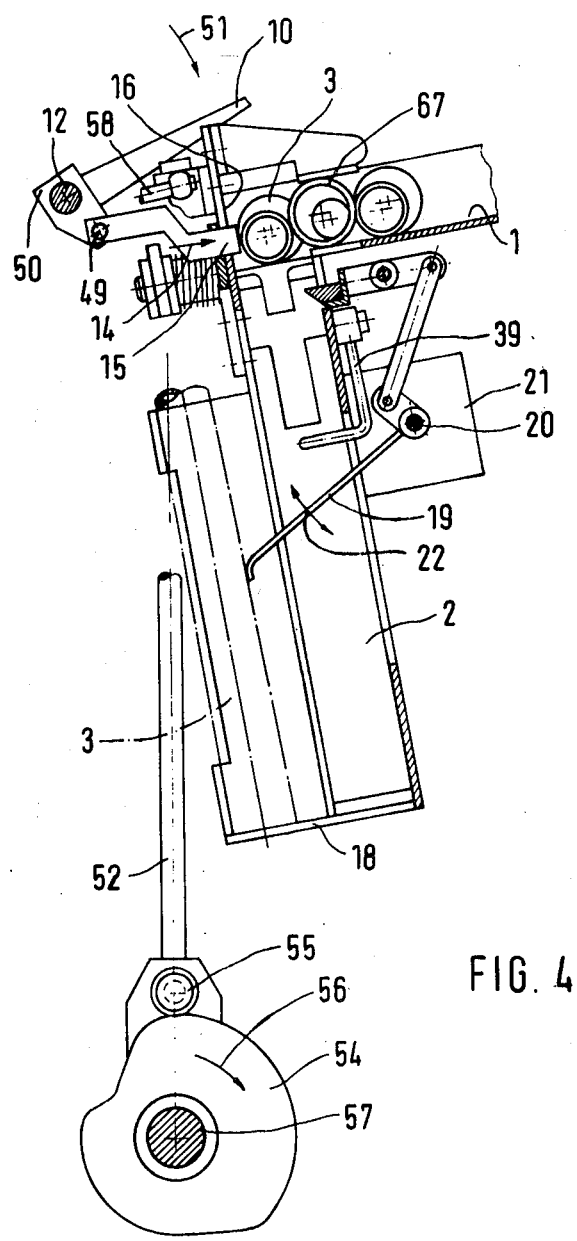
FIG. 4 is a sectional view taken along the line IV—IV of FIG. 3.
Figure 5:
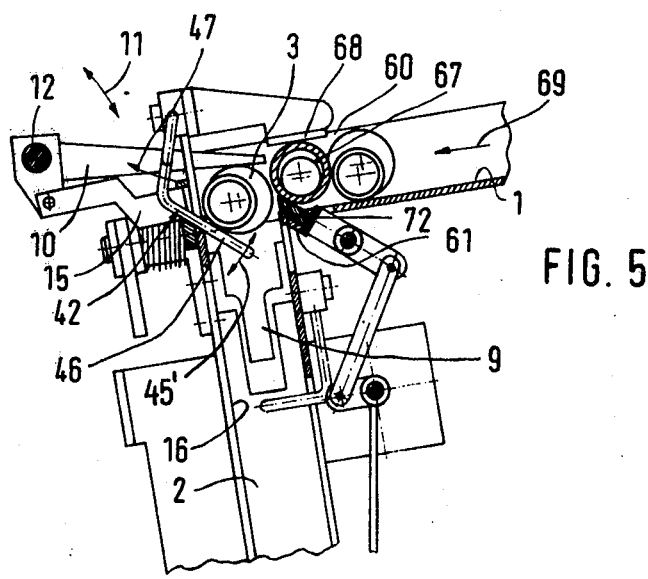
FIG. 5 is a partial view similar to FIG. 4 showing the device in an advanced operational stage.
Figure 6:
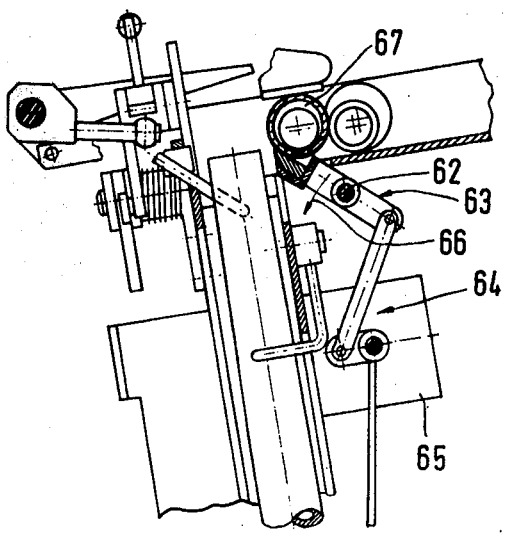
FIG. 6 is a view similar to FIG. 5 showing the device in a further operational stage.

By the thrust of the following tubes, or also by means of a feed mechanism, not shown, provided in the feed chute, a tube 3 is moved onto the supporting members 9 which are pivotable downwardly in the direction of arrows 8. Above each supporting member, a pressing finger 10 is provided which is pivotable in the direction of double arrow 11. As the access to supporting members 9 is cleared for tube 3, which is achieved by means of a special mechanism to be explained later, each pressing finger is spaced from its supporting member 9 by a distance readily permitting even the thicker tube end to pass into the gap between the supporting member and the pressing finger. The axes of rotation 12 of pressing fingers 10 and the axes of rotation 13 of supporting members 9 may be parallel or as in the shown embodiment, at right angles to each other. Two spacing members 15, spaced from each other laterally and moveable into position in the direction of arrow 14 (FIG. 4), make sure that the innermost tube 4 remains in a position spaced by a small distance of 2 to 3 mm, for example, from the rear wall 16 of turning duct 2. FIG. 4 shows the extended front end position and FIG. 5 the retracted end position of spacing members 15. These two fingers also show that feed chute 1 is inclined relative to the horizontal by an angle of 10°, for example, and that turning duct 2 extends perpendicularly thereto, i.e., has an inclination of about 10° relative to the vertical. This mutual arrangement at right angles facilitates the setting up of the tubes in a very advantageous manner. The inclination of the turning duct brings the set-up tube into a slanted position, so that the tube will tend to pass through a central opening 17 in the front wall of the turning duct. During this motion, the lower end of the tube slides on an inclined sliding plate 18. The removal of the tubes from the turning duct can be accelerated by means of an ejector 19 (FIG. 4). The ejector comprises a lever which is pivotable about an axis 20 and can be actuated by means of a rotating magnet in the direction of arrow 22. Upon leaving turning duct 2, tube 3 is guided laterally by two guide elements 23 and 24, one of which has an inwardly bent free end to form an abutment 25. Through the slot type aperture 26, tube 3, having left the turning duct in correctly set up position, is removed from the device by means of a gripping arm or the like (not shown), and transferred, for example, to a spinning or twisting machine.

The two supporting members 9, which are shown in FIG. 2 only partly, for reasons of clarity, have a convex bearing face 27. In addition, they comprise a cam or cam ratchet 28 extending in a plane perpendicular to the bearing face. The cam terminates in a notch 29, engaging a detent or ratchet member 30. Each detent member is secured to a lever arm 31 of a double-armed detent lever or ratchet lever 32 and designed as a rotatably mounted roller. To the free end of the other lever arm 33 of each detent lever 32, one end of a tension spring, more particularly a helical tension spring 34, is attached. Lever arm 33 may be provided with different, longitudinally offset attachment bores or elements for tension spring 34. It may easily be understood that spring 34 urges the two detent members 30 into engagement with their associated notches 29.

As pressing finger 10, through the thicker tube end, pushes the respective supporting member 9 downwardly, the detent member 30 is disengaged from its notch 29. Thereafter detent member 29, embodied by a roller, runs along cam 28, whose lobe-height decreases continuously with the distance from notch 29. In this way, due to the supporting action of tension spring 34, the swing-away motion of released supporting member 9 in the direction of arrow 8 (FIG. 3) is accelerated. An extension 73 of supporting member 9 butts against a fixed stop 36 and thereby terminates at least the rotational movement of member 9. Particularly, the rotational movement of detent lever 32 is thereby also terminated.

After this release operation, the thicker tube ends 4 moves along the arcuate portion 37 of turning duct 2. At first, the thinner end 7 continues to rest against its supporting member 9. In the inclined position shown in FIG. 3, the tube strikes by its central portion 38 against setting stop 39. FIG. 2 shows this setting stop in its normal position prior to the impingement of tube 3. Due to the inclined position of the tube, the setting stop is brought into a pivoted position shown in FIG. 3, in which it bears against a striking face 40 provided in the turning duct. Setting stop 39 has the effect of an acceleration of the rotary movement of tube 3 in the direction of arrow 41. At the same time, the thinner tube end 7 lifts from its supporting member 9 and moves counterclockwise toward the center of the turning duct. To prevent its swinging motion beyond the center position, an end stop 42 is provided above setting stop 39. Stop 42 is pivotable about an axis 43 in the direction of double arrow 44. Axis 45 of setting stop 39 extends parallel thereto. In addition to its pivoting in the direction of double arrow 44, end stop 42 is pivotable also perpendicularly to the drawing plane of FIG. 3. This is symbolized by a double arrow 45' in FIG. 5 where also the angular shape of end stop 42 is shown. The second axis of this cardanic joint is marked by the reference number 45' in FIG. 3. Setting stop 39 is also of angular shape, as shown in FIG. 4. Both stops are suspended in pendulum fashion.

As soon as tube 3 (FIG. 5) falls into turning duct 2, i.e., after the downward pivoting of one of supporting members 9, tube 3 strikes by its central portion 38 against the free angle leg 46 of end stop 42. Due to the inclined position of this angle leg 46, end stop 42 gives way in the direction of arrow 47, i.e., clockwise. In the back wall 16 of turning duct 2 an appropriate passage opening is provided. As soon as tube 3 passes below the lower end of end stop 42, the latter swings back into its initial position, in a direction opposite to arrow 47 and under its own weight alone. The lower the thick end 4 of tube 3 moves downwardly, the more the thinner end 7 pivots up. But because in the meanwhile, end stop 42 has re-entered the duct, thinner end 7 strikes against the free end or free angle leg 46 of end stop 42 and takes the latter along into the end position thereof shown in FIG. 3. There the end stop strikes against face 48 or another abutment. Thereby the upper tube end is braked down in the center of the duct so that, by means of the two stops 39 and 42 deflected in opposite directions, the vertical end position of tube 3 is obtained.

It is evident that due to the symmetrical arrangement of the described elements and device parts the tube will be set up with its thicker end down even if the thicker end will rest on the right instead of the left supporting member. It is therefore immaterial which position the tubes occupy in feed chute 1. The longitudinal axes of the supporting members may readily extend parallel to those of pressing fingers 10. In such a case, according to FIG. 2, the axis of rotation would lie in the drawing plane. Besides there is no need for a cardanic suspension of end stop 42 if it is provided up high enough so that it does not interfere with the fall of the tube after the release. Yet it must be located low enough so that it can still be reached by the thinner tube end.

The two spacing members 15 (FIG. 4) are eccentrically hinged, by means of a pivot pin 49, to a fastening piece 50 of pressing finger 10. Alternatively, member 15 may be rotatably mounted on a separate fastening piece mounted non-rotatably on shaft 12 of pressing fingers 10. In both cases they are withdrawn when pressing fingers 10 are positioned in the direction of arrow 51. The same applies to the lifting of pressing fingers 10. The movements must be coordinated so that the spacing members 15 will have cleared tube 4 at least as soon as one of pressing fingers 10 impinges on the thicker tube end.

Pressing fingers 10 and hence also spacing members 15 are moved back and forth by means of a lifter rod 52. The upper end of rod 52 is hinged to a pivot arm 53 mounted non-rotatably on shaft 12. Consequently this shaft 12 executes a continual reciprocating motion through a certain angle of rotation. Lifter rod 52 can be moved up and down by means of a cam plate 54. This is done by means of a roller 55, which rolls off on the circumference of cam plate 54. The plate rotates for example in the direction of arrow 56 and is driven by a motor (not shown), more particularly intermittently. Concentrically with cam plate 54, another control cam may be carried on shaft 57 about which the plate rotates, for example, for actuating electrical switches or relays. Two pivot arms 58, spaced laterally from and, particularly, symmetrical of the center, are mounted non-rotationally on shaft 12. On its free end, each arm 58 carries a rotatably mounted spherical roller 59. As the pressing fingers 10 pivot up, the two pivot arms 58 move also upwardly, and one of the two rollers 59, through extension 35, takes the deflected detent lever 32 back into its initial position, the spring 34 being tensioned at the same time. Roller 30 is thereby disengaged from cam 28 of supporting member 9. But because each supporting member is pivotable downwardly against the action of a comparatively weak return spring 70, it returns to its initial position at an instant at which the detent member 30 no longer exerts a force thereon. After supporting member 9 has regained its initial position, shaft 10 (sic) is rotated back by a small amount, so that the detent member 30 executes a short rotational movement clockwise, and engages notch 9.

At the inner end 60 of feed chute 1, directly before the turning duct 2, a controllable holding element 61 is provided. It is substantially trough-shaped, and embodied, for example, by an L-bar. It is secured to one lever arm of a double lever 63 which is rotatable about an axis 62. The other end of this double lever is connected to a rotary magnet 65, through a linkage generally designated 64. By switching the current off and on, holding element 61 can be brought into its operating position or pivoted away in the direction of arrow 66.

The holding element 61 is brought into position, i.e., pivoted in a direction opposite arrow 66, when a tube 3 rests on supporting members 9. Thereby, the next to innermost tube 67 is lifted and, at the same time, may be removed a little from the innermost tube 3. Above this next to innermost tube 67, a contact face 68 is provided against which tube 67 is pressed. In this way, the following tubes, of which only one is shown, and which by thrust in the direction of the arrow 69 (FIG. 5), are prevented from pressing the innermost tube 3 against the back wall 16 of turning duct 2. The next to innermost tube 67 is not released by the holding element 61 until all released parts have been reset again and the set-up tube 3 has been or at least is being pushed out. Rotary magnet 65 for actuating holding element 61 as well as rotary magnet 21 for moving ejector 19 may be reset by a built-in return spring. The exact instant of closing and opening the circuits of these two magnets is best determined by a cam mounted on shaft 57 and acting directly on switches or relays. The circuits for magnets 21 and 65 are closed and opened alternately. Holding element 61 and contact face 68 may be provided with an anti-skid coating 72. The pivot pin of supporting members 9 is designated 71.

I claim:

1. A device for setting up in non-reversed position rod-shaped bodies having unequally thick ends, more particularly, conical tubes for spinning, twisting, and similar machines, comprising a feed chute having an inner end, a feed duct, characterized in that at the inner end of the of the feed chute (1), two supporting members (9), for the two ends (4, 7) of the body are disposed which members are movable against a holding force and that above each of the supporting members a pressing finger (10) is provided at a distance exceeding the thickness of the thicker body end (4), both pressing fingers being movable into engagement simultaneously, and the supporting member supporting the thicker end being movable by the tube end resting thereon as soon as the pressing finger is applied to the thicker end.

2. A device according to claim 1, characterized by a turning duct (2) which is symmetrical to a vertical plane, tapers downwardly in arcuate form, is located below the supporting members (9).

3. A device for the non-reversed setting up of rod-shaped bodies having ends of different thicknesses and particularly for orienting conical tubes for yarn spinning and twisting machines, comprising means for feeding a series of bodies along a feed path with their sides adjacent and their ends generally aligned, an opening adjacent an end of said feed path, first and second spaced apart support means disposed in the opening adjacent each end of the bodies fed along the path, first and second pressing fingers moving through a path overlying the endmost one of the bodies over the opening and overlying a respective end of the body over the respective first and second support means, means for moving said first and second fingers simultaneously so that they move over the associated endmost one of the bodies at the same closing distance in respect thereto, so that the one overlying a thicker end contacts the associated body first to deflect this end downwardly, means responsive to the downward movement of the thicker end of the body connected to said first and second support means to remove the associated one of said first and second support means which underlies the thicker end of the body to permit dropping of the thicker end first.

4. A device according to claim 3, including a turning duct disposed below said support means arranged symmetrical to a vertical plane and tapering down in an arcuate form defining a guide for the thicker end of said body for guiding the body to a substantially vertical orientation.

5. A device according to claim 4, including a pendulum stop member centrally arranged in said duct member, being rotatable about an axis approximately normal to the plane of said duct, said setting stop having a free end disposed at an angle which extends across said duct.

6. A device according to claim 5, including an end stop arranged centrally in a turning duct above said setting stop being rotatable about an axis extending approximately perpendicular to the turning duct plane in a position to engage the upper end of the body as the lower end is deflected to a vertical position.

7. A device according to claim 6, wherein said end stop is a pendulum member pivotally mounted in said duct, and having a free end below the axis of rotation of said setting stop with an angle leg portion which traverses said duct crosswise.

8. A device according to claim 7, wherein said end stop is rotatable about a second axis normal to its axis of rotation, said duct having a back wall with a passage opening for the end stop.

9. A device according to claim 3, wherein said first and second support means comprises a support member rotatably mounted below each respective end of the tube in the opening, said means responsive to the movement of said thicker end of said body comprising a rotatable cam detent engaged with said support member being released by rotatable movement thereof.

10. A device according to claim 9, including means biasing said support members to a starting position in which they support a respective end of said tube and engage with said detent member.

11. A device according to claim 10, wherein each detent member comprises a lever arm of a double arm ratchet lever and including spring means connected between the respective other arms of said ratchet lever.

12. A device according to claim 3, wherein said first and second support means comprises rotatable support members, means biasing said members to a supporting position, a cam ratchet connected to said support members for rotation therewith, a double-arm ratchet lever having one end engaged with said cam ratchet and having an opposite free end, a connecting spring connecting the free ends of said ratchet lever to bias them into an engaged position with said cam ratchet, said cam being movable with said support means to release said ratchet to permit further movement of said cam relative to said ratchet, said ratchet lever having a roller engageable on the surface of said cam, said cam having a height decreasing in a release direction.

13. A device according to claim 12, including a turning duct arranged below said first and second support means, each supporting member being rotatable about an axis extending crosswise to the plane of said turning duct and normal to the longitudinal axis the body resting thereon, said first and second support members having plate-type ends which point toward each other.

14. A device according to claim 13, wherein said plate-type bearing ends of said support members are arched convexly.

15. A device according to claim 14, including a spacing member movable into said feed path, connected to said first and second pressing fingers holding the endmost one of said bodies so it is engaged by said pressing fingers.

16. A device according to claim 15, including means coupling said pressing fingers and said spacing members together for movement together, said pressing fingers being moved after at least partial retraction of said spacing members.

17. A device according to claim 3, including a rotatable shaft, said first and second pressing members being connected to said shaft for rotation therewith, a fastening member carried on said shaft, and a spacing member connected on said fastening member and being movable by rotation of said shaft with said pressing finger.

18. A device according to claim 17, including a lifter rod connected to said shaft and an eccentric connected to said lifter rod to oscillate said lifter rod to effect oscillation of said shaft.

19. A device according to claim 18, wherein said lifter rod effects lifting of said pressing fingers by rotation of said shaft immediately after associated one of said first and second support means is dropped in accordance with which end is the thicker end.

20. A device according to claim 18, including a pivot arm carried on said shaft engageable with said pressing finger to return it to a locked position.

21. A device according to claim 3, including means for biasing said first and second support means to a support position and spring means stronger than said biasing means for moving said support means into a release position.

22. A device according to claim 3, including a controllable holding element movable into and out of the path of feed of said bodies for holding one of said bodies in a standby position.

23. A device according to claim 22, wherein said holding element comprises a pivotable lever having a pressure contact face which moves upwardly into the feed path to engage the respective body, and having an anti-skid covering thereon.

24. A device according to claim 23, including magnet means for controlling the movement of said holding element.

25. A device according to claim 3, including a turning duct located below said first and second support means having a camming surface for turning the lower end of the body and having a transverse opening with a bottom wall forming an inclined plane for the movement of the duct therealong.

26. A device according to claim 3, wherein said means for feeding said bodies includes a feed duct having first and second angle members defining respective sides thereof.

27. A device according to claim 3, including wherein said means for feeding said bodies include an inlined feed chute, said turning duct being located below one end of said feed chute, said duct being arranged at substantially right angles to said turning duct.

28. A device according to claim 7, wherein said turning duct includes guide walls for guiding the thickest end of said body, having a lateral opening and an ejector engageable with said body for moving it through the lateral opening.

29. A device according to claim 10, wherein said ejector comprises at least one pivot lever and magnet means for positioning said pivot lever.

* * * * *